US006907809B1

(12) United States Patent
Rein

(10) Patent No.: US 6,907,809 B1
(45) Date of Patent: Jun. 21, 2005

(54) POSITIONING DEVICE FOR SAW BLADES

(75) Inventor: Harry Rein, Tübingen (DE)

(73) Assignee: Walter AG, Tübingen (DE)

(*) Notice: Subject to any disclaimer, the term of this patent is extended or adjusted under 35 U.S.C. 154(b) by 0 days.

(21) Appl. No.: 09/959,691

(22) PCT Filed: May 2, 2000

(86) PCT No.: PCT/DE00/01256

§ 371 (c)(1),
(2), (4) Date: Dec. 13, 2001

(87) PCT Pub. No.: WO00/66308

PCT Pub. Date: Nov. 9, 2000

(30) Foreign Application Priority Data

May 3, 1999 (DE) .............................. 199 20 099

(51) Int. Cl.$^7$ ........................ B27B 11/02; B23D 63/12; B24B 19/00
(52) U.S. Cl. ..................... 83/829; 76/43; 76/45; 76/48; 76/77; 451/374; 451/403
(58) Field of Search ................................ 76/41, 37, 45, 76/43, 77, 48; 83/829; 451/8, 9, 18, 45, 374, 451/403

(56) References Cited

U.S. PATENT DOCUMENTS

| | | | | |
|---|---|---|---|---|
| 48,546 A | * | 7/1865 | Foster | ............................ 76/43 |
| 3,646,593 A | * | 2/1972 | Schubert | ...................... 451/14 |
| 4,016,781 A | * | 4/1977 | Dudley | ........................... 76/40 |
| 4,018,107 A | * | 4/1977 | Stier | .............................. 76/41 |
| 4,018,109 A | | 4/1977 | Stier | |
| 4,111,075 A | * | 9/1978 | Varley | ........................... 76/41 |
| 4,357,841 A | * | 11/1982 | Mote | .............................. 76/41 |
| 4,418,589 A | * | 12/1983 | Cowart, Sr. | ................... 76/112 |
| 4,483,217 A | * | 11/1984 | Beck et al. | .................... 76/75 |
| 4,657,428 A | * | 4/1987 | Wiley | ..................... 403/359.3 |
| 4,730,952 A | * | 3/1988 | Wiley | ......................... 403/316 |
| 4,819,515 A | * | 4/1989 | Pfaltzgraff | ..................... 76/41 |
| 4,901,604 A | * | 2/1990 | Emter | ........................... 76/41 |
| 5,078,029 A | | 1/1992 | Boggs et al. | |

FOREIGN PATENT DOCUMENTS

| | | | | |
|---|---|---|---|---|
| DE | 30 48 738 | | 7/1982 | |
| DE | 32 30 277 | | 2/1984 | |
| DE | 4113854 A | * | 10/1992 | ......... B23D 63/12 |
| DE | 196 30 057 | | 9/1997 | |

* cited by examiner

Primary Examiner—Allan N. Shoap
Assistant Examiner—Isaac Hamilton
(74) Attorney, Agent, or Firm—Venable LLP; Stuart I. Smith

(57) ABSTRACT

A saw blade positioning device has two drive mechanisms and two guidance devices, which are preferably oriented at right angles in respect to each other. If a first guidance device is oriented in the radial direction of the circular saw blade by the linear guides, and the other guidance device in the circumferential direction, a desired advancement curve of the engagement member, independently of the saw blade diameter, is achieved respectively by means of the same control, or respectively the same control pulses, and of the drive mechanisms, in every radial position of the first guidance device.

Figure 1:
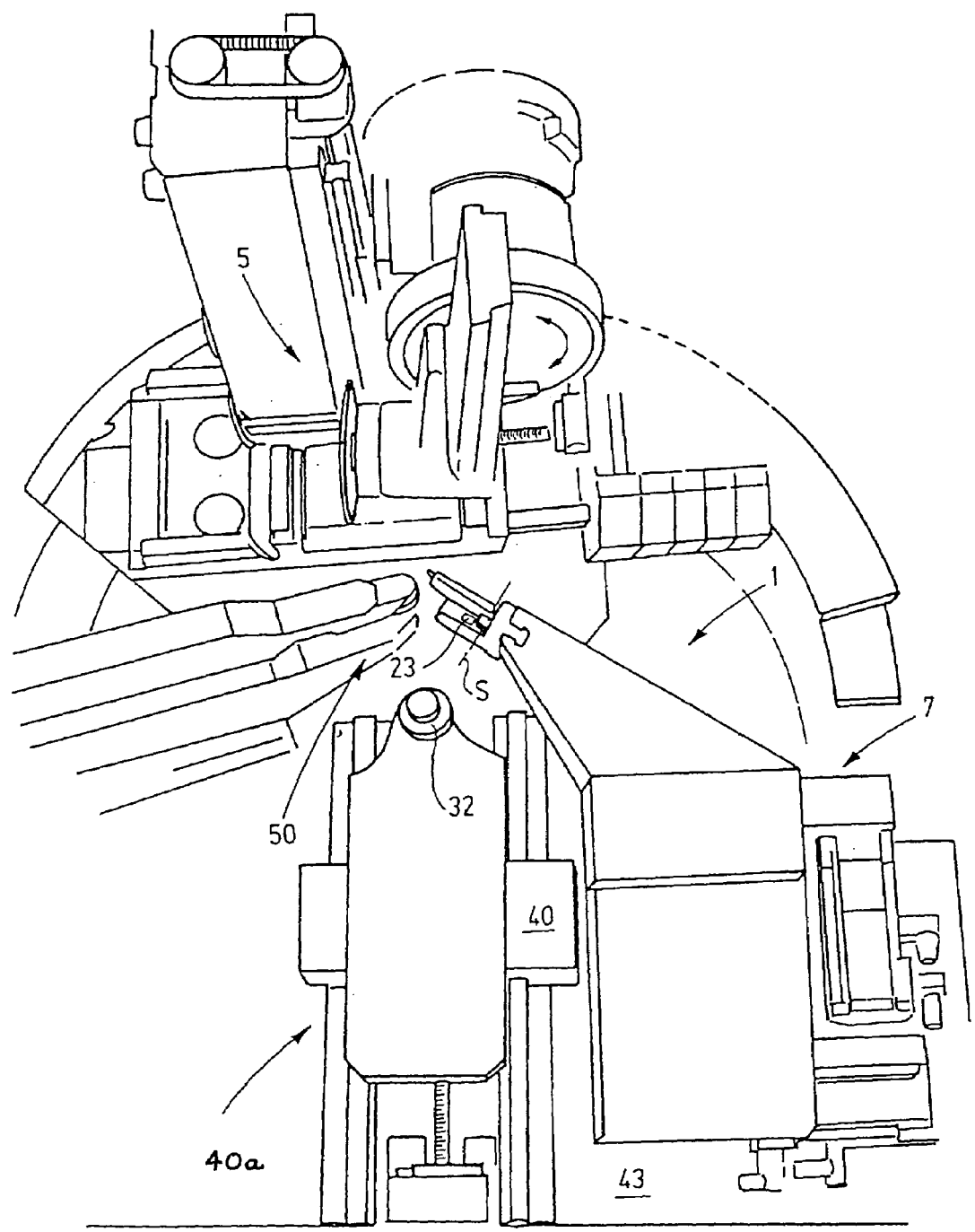

A mechanically robust basic structure results in addition, which makes a precise positioning possible.

16 Claims, 5 Drawing Sheets

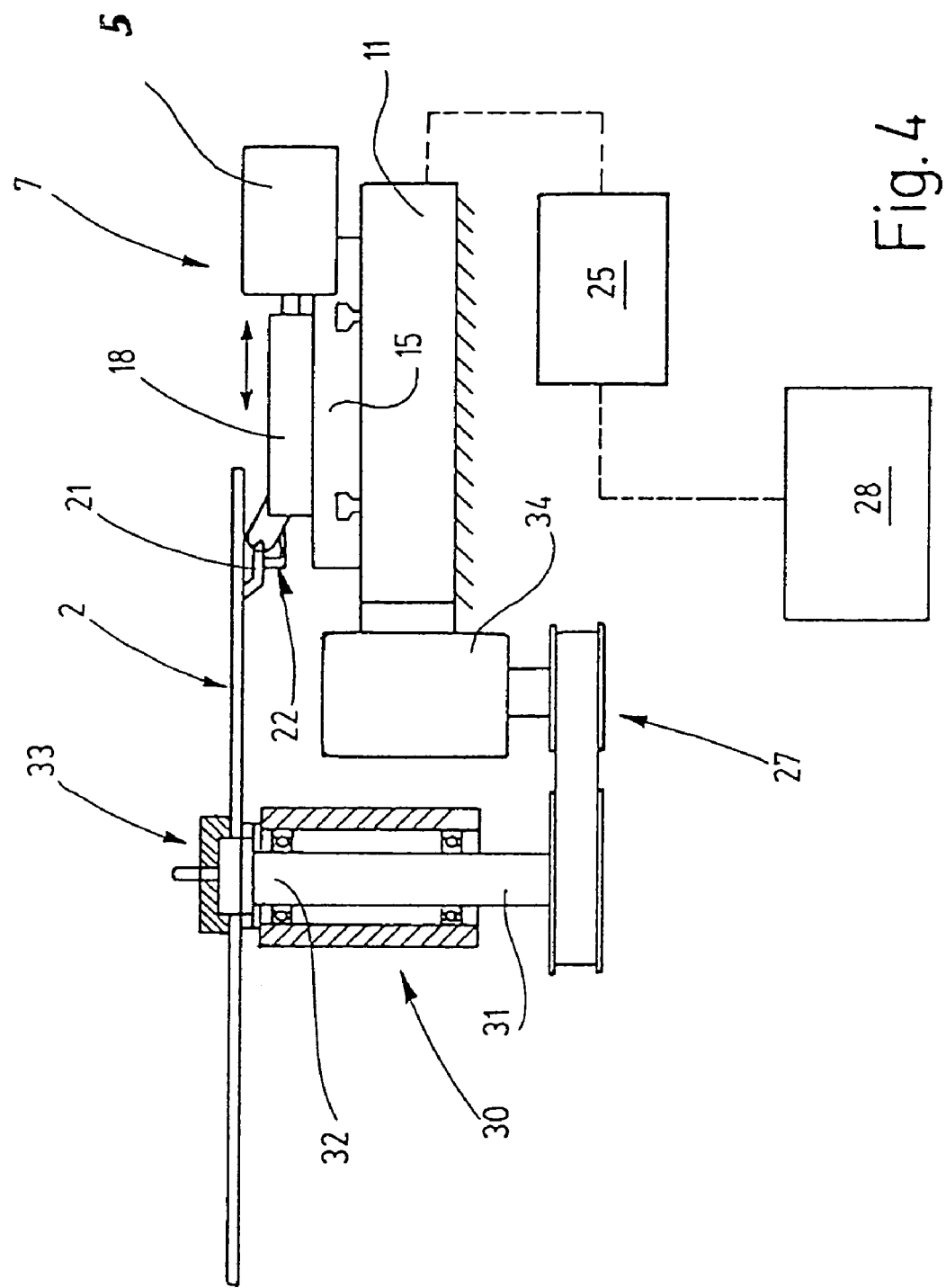

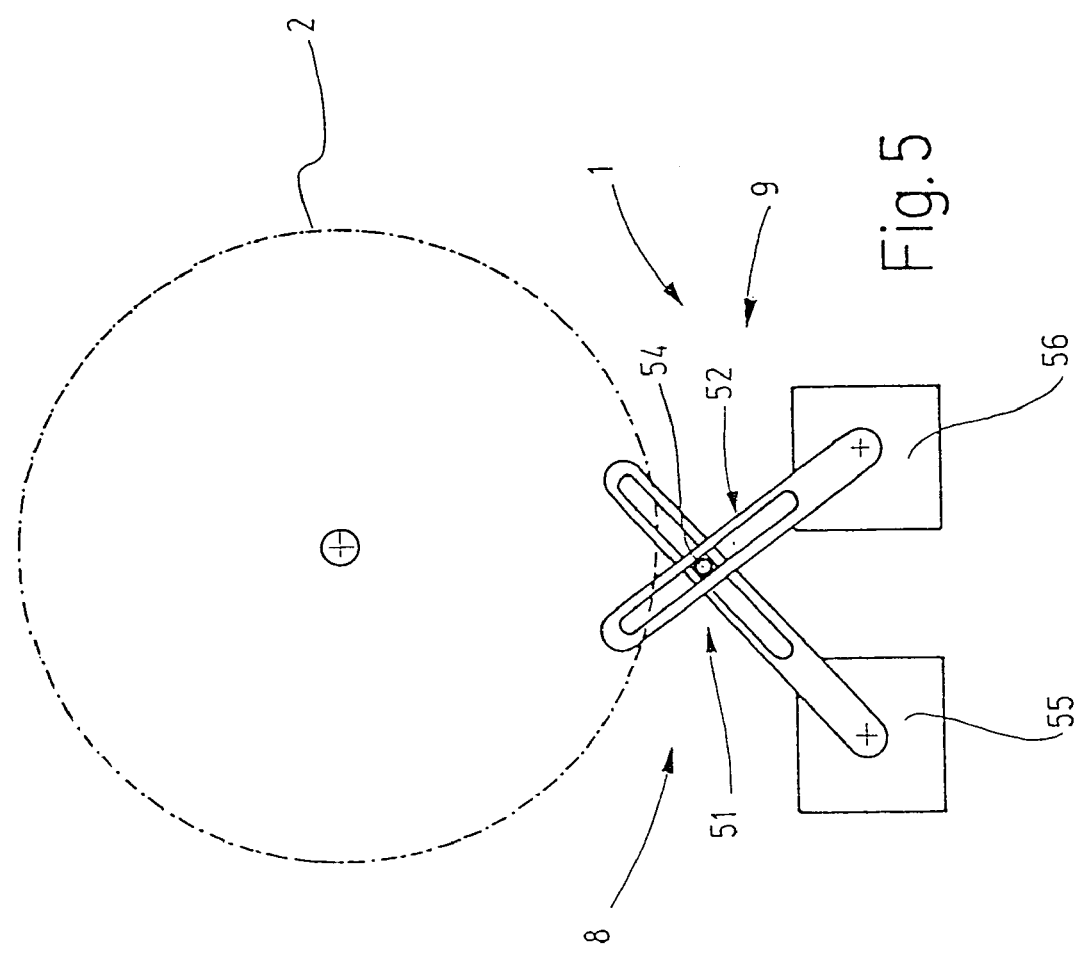

POSITIONING DEVICE FOR SAW BLADES

The invention relates to a positioning device which, in particular, is used for the defined, step-by-step positioning of circular saw blades or other saw blades on a saw blade processing machine, for example a grinding machine. The invention also relates to a saw blade sharpening machine with a positioning device as described above.

Saw blades have teeth, which are arranged in a row one behind the other, each of which has been provided with a ground surface. To create these, it is necessary to move the teeth successively into the processing position. One or several processing positions at a processing machine are determined by appropriate grinder heads, which work on the respective tooth, which has been positioned and is maintained in place.

In the end, the exactness of the positioning of the saw blade determines the exactness of the finished ground saw blade.

In connection with saw blade grinding machines used for regrinding (mixed lots) and in the production of saw blades in particular, it is necessary to be able to adapt the saw blade grinding machine to different saw blade diameters, tooth sizes and tooth shapes. This applies not only in respect to the receiver for the saw blade and in respect to the grinder heads, but also in respect to a saw blade positioning device used for the step-by-step advancement of the saw blade. It is necessary that the saw blade can be exactly positioned by means of this, regardless of its diameter and the size of the teeth.

An advancement arrangement for the step-by-step rotation of a saw blade is known from DE 32 30 277 C2. This advancement arrangement has an advancement ratchet which is rigidly connected with a ratchet support. The ratchet support, together with a guide body, as well as a linear drive mechanism, is pivotably seated. The linear drive mechanism is used to move the ratchet support back and forth approximately in the circumferential direction of the saw blade. A guide bar, which is designed to be length-adjustable, is used for supporting and for setting the pivot position of the pivotably seated guide body. It is connected with one end with the guide body, while it is pivotably seated at a fixed point with its other end. The guide bar contains a linear drive mechanism, by means of which the length of the guide bar can be adjusted. A superimposition of the advancement movement of the ratchet support on a length change of the guide bar results in the path curve required for the step-by-step further rotation of the saw blade.

Three rotation points are contained in the total system, besides the two linear axes of the drive mechanisms, namely the axis of rotation of the guide body and the two link or rotational axes on the two ends of the guide bar. Because of this, positioning can become somewhat difficult.

Moreover, the correlation between the driving movement of the two linear drive mechanisms and the resultant path curves of the advancement finger is a function of the diameter of the saw blade.

Based on the foregoing, it is the object of the invention to provide a simplified positioning device, which will permit a simple adaptation to saw blades of different sizes.

This object is attained by means of the positioning device in accordance with claim 1.

The saw blade positioning device in accordance with the invention has a seating arrangement for receiving a saw blade. The seating arrangement can be embodied to be completely passive, i.e. to make only the seating possible. If required, a drive mechanism can be assigned to the seating arrangement, which acts with a torque, or respectively a force, on the saw blade received in the seating arrangement in a predetermined rotation or displacement direction. This can be useful for maintaining a tooth of the saw blade in contact with an engagement member which, for example, acts on a tooth for accomplishing the step-by-step advancement of the saw blade. In this case, if needed, the drive mechanism connected with the seating arrangement can be designed in such a way that the torque or the force can be controlled in a timed manner, and therefore as a function of the size. In addition, the torque generation can be matched to a movement of the engagement member.

The saw blade positioning device in accordance with the invention has at least two guidance devices, with which a carriage can be positioned in two spatial directions which are independent of each other. This carriage supports the engagement member. The carriage is positioned by two drive mechanisms, wherein a level curve, through which the engagement member moves, is created by superimposing the two positioning movements.

The engagement member is supported by a compound slide rest. Preferably, the two paths of the compound slide rest are of different lengths. For example, a first path, which is approximately oriented in the circumferential direction, has the maximum size of the saw blade radius (or the maximum tooth distance projected on the direction). In this case the path, which is approximately parallel with the radial direction of the saw blade (a connecting line between the saw blade axis of rotation and the grinding location), has the maximal size of half the saw blade radius.

The saw blade positioning device has only two guidance devices which, as a whole, permits the exact positioning of the saw blade. The guidance devices can be rigidly designed; this makes it possible to position the saw blade against a torque applied to them, because or which the engagement member and the respective tooth can be definitely maintained in contact.

The drive mechanisms are preferably servo motors or other position-monitored or position-controlled drive mechanisms. The generation of the desired path curve is possible in a simple way, independently of the actual saw blade diameter. This applies in particular when using linear guides as guidance devices which have guidance directions which are oriented at right angles to each other. A microcomputer control device, for example, provides the control of the drive mechanisms, and controls the drive mechanisms in accordance with the respective conditions of the saw blade to be actually processed, i.e. its respective diameter and its pitch. The data can be directly obtained from a detection device.

In principle, the engagement member can be rigidly or pivotable seated on the carriage. A pivotable seating makes an operation in the manner of a ratchet possible, which moves along the sides of the teeth of the saw blade. In this case the engagement member can be pivoted out of the gap between the teeth by means of an actuating device (pivoting device).

Here, a sensor device can not only be used for position monitoring, but also for detecting the gaps between the teeth.

An adjustment device, with which the distance between the axis of rotation of the seating arrangement and the grinder head of a saw blade sharpening machine can be adjusted, is preferably used for adaptation to different saw blade diameters.

Advantageous details of embodiments and further developments of the invention are the subject of dependent claims and/or ensue from the drawings or the description.

Exemplary embodiments of the invention are represented in the drawings.

Figure 2:
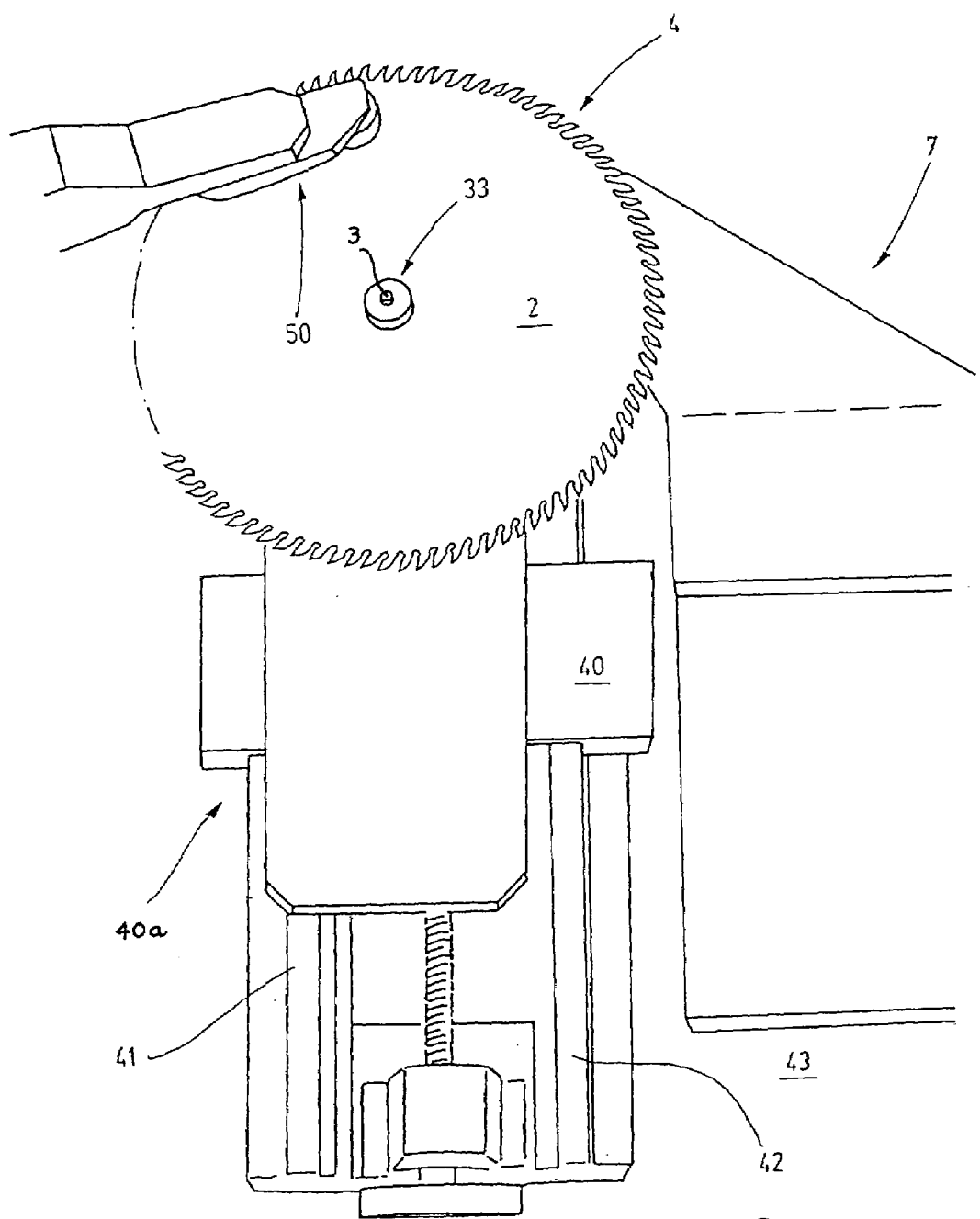
Figure 3:
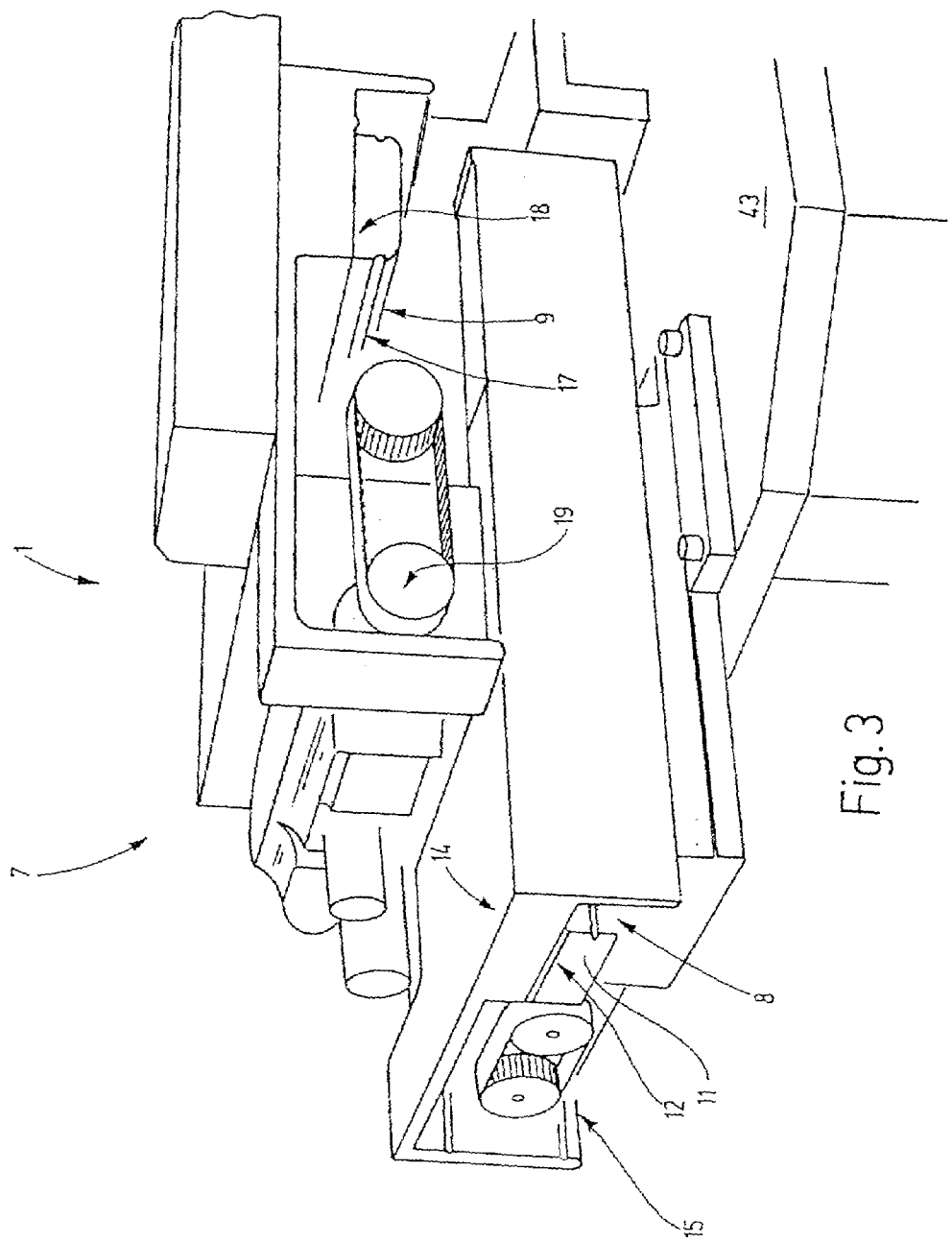

FIG. 1 is a schematic is perspective representation in principle of a saw blade grinding machine with a saw blade positioning device in accordance with the invention, FIG. 2 is a partial view from above on the saw blade grinding machine in FIG. 1 with a circular saw blade, FIG. 3 shows the saw blade positioning device in a view from above, FIG. 4 is a schematic, partially cut lateral view of the saw blade positioning device in FIG. 1, and FIG. 5 is a schematic view from above on a changed embodiment of a saw blade positioning device.

A saw blade grinding machine with a saw blade positioning device 1, which is used for the step-by-step turning of a circular saw blade 2 (FIG. 2) around its axis of rotation 3 is represented in FIG. 1. On its circumference, the saw blade 2 has teeth 4, which are to be sequentially worked by a positionable grinder head 5. If necessary, several grinder heads can also be provided.

A positioning device 7, designed in the manner of a compound table, is a part of the saw blade positioning device 1. It has (as shown in FIGS. 1 and 3) a first guidance device 8 and a second guidance device 9, whose guidance directions are oriented at right angles in respect to each other. The first guidance device 8 contains a stationarily seated guide element 11, on which a carriage 14 is seated, displaceable in a first direction (Z) by means of a linear guide 12. The movement of the carriage 14 is controlled by a first drive mechanism 15, constituted by a servo motor. The carriage can be positioned and its position fixed in place by means of the servo motor.

The carriage 14 supports the second guidance device 9, constituted by a linear guide 17 and a carriage 18 guided by the latter. The guidance direction (X) is at right angles with the guidance direction (Z) determined by the guidance device 8 and is oriented, related to the grinding location, approximately in the circumferential direction toward the circular saw blade 2. The position and displacement of the carriage 18 is determined by an electrical drive mechanism 19, i.e. an appropriate servo motor, for example. The drive mechanism 19 is supported by the carriage id.

The drive mechanisms 15, 19 are connected via gears with constant transmission ratios to the carriages 14, 19, so that a movement of the drive mechanisms 15, 19 is always converted proportionally to a movement of the carriage 18. This simplifies the control and makes possible a constant precision over the entire movement range of the carriage 18.

Furthermore, the carriage 18 supports a finger 21, which is seated, pivotable around a pivot axis (S), and is used as the engagement member, and which can be inserted into gaps detected between the teeth 4, when needed. The finger 21 is constituted, for example, by a pin of round or polygonal cross section. If required, it can also have a cutter-like edge facing the tooth face.

The finger 21 is connected with a pneumatic cylinder 22 or another pivoting device so that, when required, it can be pivoted out (toward the bottom) of a gap between teeth against the force of a spring. The pivot movement is monitored by a sensor device 23, which discriminates between at least two states, the engaged state with the finger in the gap between teeth and the lifted-out state.

Both drive mechanisms 15, 19 are connected to a control device 25, which also controls the grinder head 5, or respectively its positioning devices and, if provided, an arrangement 27, which can be seen, for example, in FIG. 4, for applying a torque to the saw blade 2. The control device 25 can be connected to a sensor device 28 or a different detection device, which provides the data (diameter, pitch, etc.), which are characteristic for the circular saw blade 2.

The seating, in particular of the circular saw blade 2 by means of a seating arrangement 30, can be seen in FIG. 4. The seating arrangement 30 has a rotatably seated shaft 31, which has a clamping device 33 for the circular saw blade 2 on a free end 32. An actuating motor 34 or a controlled brake, which can generate a torque which checks the rotation of the circular saw blade 2, is connected to the opposite end, for example via a belt drive.

The seating arrangement 30 can preferably be displaced away from the grinding head or toward it. It is mounted on a carriage 40 of a linear guide 40a for this purpose. The carriage 40 is guided on the guide rails 41, 42 which, for guiding the engagement member, are seated fixed in place on a machine frame 43, the same as the compound table (positioning device 9). The guidance direction of the linear guide 41 is preferably parallel with one of the guidance directions (X, Y) of the positioning device 9. Preferably the control device 25 also controls a drive mechanism for the linear guide 40a.

The saw blade positioning device 1 described up to now operates as follows:

If a circular saw blade 2 to be processed is positioned on the seating arrangement 30, the control device 25 is initially provided with the essential data of the circular saw blade 2 by the detection device 28. For positioning the circular saw blade 2, the control device 25 triggers the pivoting device 22 for lowering the finger 21 and thus to move it out of the saw blade plane.

Then the control device 25 triggers the drive mechanisms 15 and 19 in such a way that the finger 21 is located in a preset position under a gap between teeth. When this position has been reached, the pivoting device 22 is released and the finger 21 enters into the gap between the teeth. The control device 25 now triggers the drive mechanisms 15 and 19 in order to move the finger 21 in the circumferential direction of the circular saw blade 2. In the course or this the finger 21 comes into engagement with a tooth face which it pushes, while turning the circular saw blade 2, into a defined position which determines a processing position or the circular saw blade 2. In this position the saw blade can now be clamped in place by the clamping cheeks 50 in the vicinity of the grinder head 15 and can be subjected to a grinding process.

In the meantime the linger 21 can be pivoted out of the gap between the teeth and pivoted into the next gap between teeth. To this end the drive mechanisms 15, 19 and the pivoting device 22 are triggered by the control device 25 in such a way, that initially the finger 21 is lifted off the tooth face, is the axially pivoted out of the gap between the teeth and moved to the next gap between teeth. For this purpose the finger 21 is displaced by one tooth spacing against the direction of rotation of the circular saw blade 2, and is again pivoted into the gap between the teeth. When the grinding process is finished, the grinder head 5 is taken out or engagement with the circular saw blade 2, and the clamping of the circular saw blade 2 is released. It can now be moved into its next processing position by actuating the drive mechanisms 15, 19, in that the finger 21 pushes the tooth in front of it forward by exactly one tooth spacing.

In a slightly altered embodiment, the finger 21 acts on a tooth which is different from the tooth being ground. During the grinding process of the first tooth, the finger 21 can then remain in contact with the other tooth at which positioning is performed, wherein the drive mechanism 34 builds up a counter force to the finger 21 and the drive mechanism 19. To prevent vibrations, the circular saw blade can be additionally clamped in place by the clamping device 50 in the vicinity of the grinder head 5. When the finger 21 is to be inserted into the next gap between teeth, the actuating device 34 can be used to hold the circular saw blade 2 captively. Alternatively the clamping device 50 can be used for this.

A simplified and changed embodiment is schematically represented in FIG. 5. This saw blade positioning device 1 has two linear guides 51, 52, each of which is pivotably seated by itself and both of which together seat a carriage 54. The latter is schematically indicated in FIG. 5 by a pin. The linear guides 51, 52 are positioned by pivoting drive mechanisms 55, 56, both of which are stationarily seated. In contrast to this, only the drive mechanism 15 is stationarily seated in the embodiments in accordance with FIGS. 1 to 4, while the drive mechanism 19 is taken along by the carriage 18 and is therefore movably seated.

In the embodiment in accordance with FIG. 5, a movement of the carriage 54 supporting the engagement member is also achieved by superimposing the driving movements of two drive mechanisms, namely the pivoting drive mechanisms 55, 56. As in the embodiments in accordance with FIGS. 1 to 4, the curve traveled by the engagement member is a level curve (circle) parallel with the plane fixed by the circular saw blade 2.

A saw blade positioning device 1 has two drive mechanisms 15, 19 and two guidance devices 8, 9, which are preferably oriented at right angles in respect to each other. If a first guidance device is oriented oriented in the radial direction of the circular saw blade by the linear guides, and the other guidance device in the circumferential direction, a desired advancement curve of the engagement member, independently of the saw blade diameter, is achieved respectively by means of the same control, or respectively the same control pulses, and of the drive mechanisms 15, 19, in every radial position of the first guidance device.

A mechanically robust basic structure results in addition, which makes a precise positioning possible.

What is claimed is:

1. A saw blade positioning device, for a saw blade grinding machine, comprising:
    a seating arrangement for receiving a saw blade;
    a first linear guidance device, which has a first guide element and a first carriage displaceably seated on the first guide element, and with which a first drive mechanism is associated for moving the first carriage on the first guide element in a first guidance direction;
    a second linear guidance device, which has a second guide element and a second carriage displaceably seated on the second guide element, and to which a second drive mechanism is associated for moving the second carriage on the second guide element in a second guidance direction, wherein the guidance directions of the guidance devices are located in a plane parallel with the saw blade; and
    an engagement member which is fitted for coming into engagement with the saw blade in an engagement position of the engagement member and is supported by the second carriage of the second guidance device, the engagement member being for moving the saw blade while the engagement member is in the engagement position,
    wherein said second linear guidance device is supported by the first carriage, said first drive mechanism moves the first carriage relative to said seating arrangement, and said second drive mechanism moves the second carriage relative to said seating arrangement.

2. The saw blade positioning device in accordance with claim 1, wherein the first guide element of the first guidance device is stationarily seated, and that the second guide element of the second guidance device is seated on the first carriage of the first guidance device.

3. The saw blade positioning device in accordance with claim 2, wherein the second drive mechanism is supported by the first carriage.

4. The saw blade positioning device in accordance with claim 1, wherein the guidance directions are fixed at right angles to each other.

5. A saw blade positioning device for a saw blade grinding machine, comprising:
    a seating arrangement for receiving a saw blade;
    a first linear guidance device, which has a first guide element and a carriage displaceably seated on the first guide element, and with which a first drive mechanism is associated for moving the carriage on the first guide element in a first guidance direction;
    a second linear guidance device, which has a second guide element and a carriage displaceably seated on the second guide element, and with which a second drive mechanism is associated for moving the carriage on the second guide element in a second guidance direction, wherein the guidance directions of the guidance devices are located in a plane parallel with the saw blade; and
    an engagement member which is fitted for coming into engagement with a saw blade in an engagement position of the engagement member and is supported by the carriage of the second guidance device, the engagement member being for moving the saw blade while the engagement member is in the engagement position,
    wherein the guide elements of the first and second guidance devices are each seated movably by themselves and have a common carriage.

6. The saw blade positioning device in accordance with claim 5, wherein the drive mechanisms are stationarily seated.

7. The saw blade positioning device in accordance with claim 1, wherein the engagement member is connected with the second carriage and is pivotable around a pivot axis.

8. The saw blade positioning device in accordance with claim 7, wherein the pivot axis is parallel to the saw blade.

9. The saw blade positioning device in accordance with claim 7, wherein the engagement member is resiliently biased toward an engagement position.

10. The saw blade positioning device in accordance with claim 7, wherein a pivoting device is associated with the engagement member for pivoting the engagement member out of its engagement position into a lifted-out position out of the engagement with the saw blade.

11. The saw blade positioning device in accordance with claim 7, wherein a sensor device for determining the position of the engagement member is associated with the engagement member.

12. The saw blade positioning device in accordance with claim 1, wherein the seating arrangement fixes an axis of rotation for the saw blade.

13. The saw blade positioning device in accordance with claim 12, wherein the seating arrangement can be displaced transversely in relation to the axis of rotation by means of a displacement arrangement.

14. The saw blade positioning device in accordance with claim 1, wherein the saw blade has teeth, and a control device is provided for controlling the drive mechanisms in accordance with preset instructions such that the saw blade is moved step-by-step and by gaps between the teeth.

15. The saw blade position device in accordance with claim 14, wherein the control device receives data regarding the saw blade from a detection device.

16. A saw blade sharpening machine with a positioning device comprising:
- a seating arrangement for receiving a saw blade;
- a first linear guidance device, which has a first guide element and a first carriage displaceably seated on the first guide element, and with which a first drive mechanism is associated for moving the first carriage on the first guide element in a first guidance direction;
- a second linear guidance device, which has a second guide element and a second carriage displaceably seated on the second guide element, and with which a second drive mechanism is associated for moving the second carriage on the second guide element in a second guidance direction, wherein the guidance directions of the guidance devices are located in a plane parallel with the saw blade; and
- an engagement member which is fitted for coming into engagement with a saw blade in an engagement position of the engagement member and is supported by the second carriage of the second guidance device, the engagement member being for moving the saw blade while the engagement member is in the engagement position,
- wherein said second linear guidance device is supported by the first carriage, said first drive mechanism moves the first carriage relative to said seating arrangement, and said second drive mechanism moves the second carriage relative to said seating arrangement.

* * * * *

UNITED STATES PATENT AND TRADEMARK OFFICE
CERTIFICATE OF CORRECTION

PATENT NO. : 6,907,809 B1
DATED : June 21, 2005
INVENTOR(S) : Harry Rein

It is certified that error appears in the above-identified patent and that said Letters Patent is hereby corrected as shown below:

Tilte page,
Item [86], PCT NO., delete "PCT/DE00/01256" and insert -- PCT/DE00/01356 --.

Signed and Sealed this

Thirteenth Day of December, 2005

JON W. DUDAS
*Director of the United States Patent and Trademark Office*